Oct. 8, 1957 F. L. HOPKINS ET AL 2,808,858
MACHINE FOR WEIGHING AND DISPENSING BULK MATERIAL AND HAVING
MEANS FOR IMPREGNATING SAID MATERIAL WITH LIQUID
Filed Jan. 6, 1956 3 Sheets-Sheet 1

INVENTORS
FRANK L. HOPKINS
JACK D. HELM
BY
Merchant & Merchant
ATTORNEYS

Oct. 8, 1957   F. L. HOPKINS ET AL   2,808,858
MACHINE FOR WEIGHING AND DISPENSING BULK MATERIAL AND HAVING
MEANS FOR IMPREGNATING SAID MATERIAL WITH LIQUID
Filed Jan. 6, 1956   3 Sheets-Sheet 2
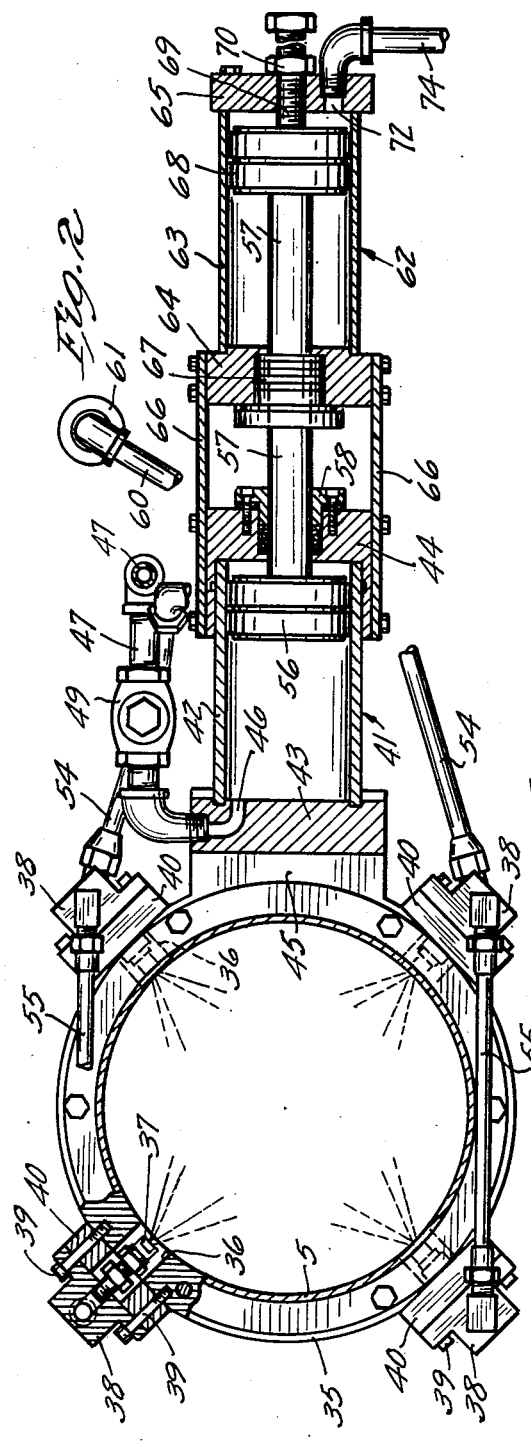
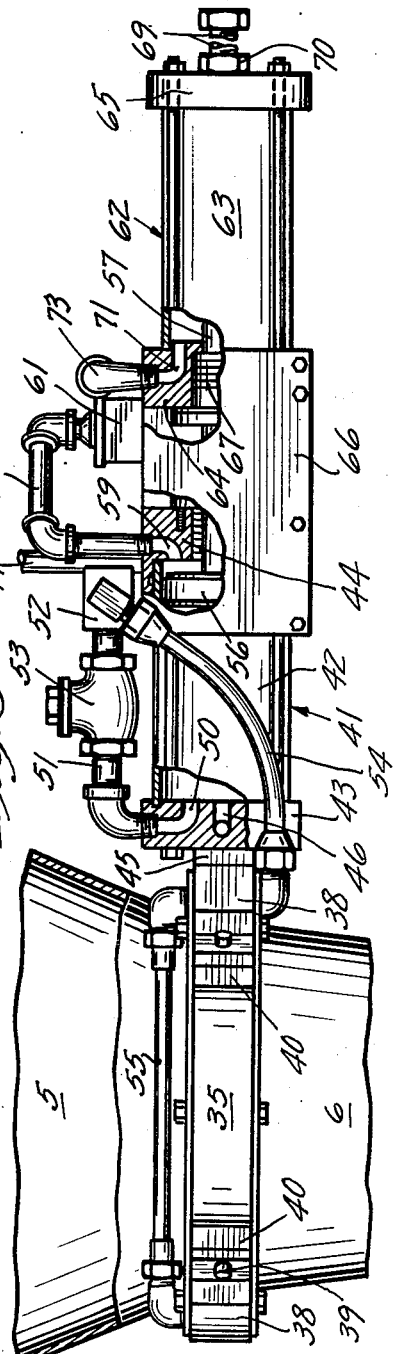
INVENTORS
FRANK L. HOPKINS
JACK D. HELM
BY
ATTORNEYS

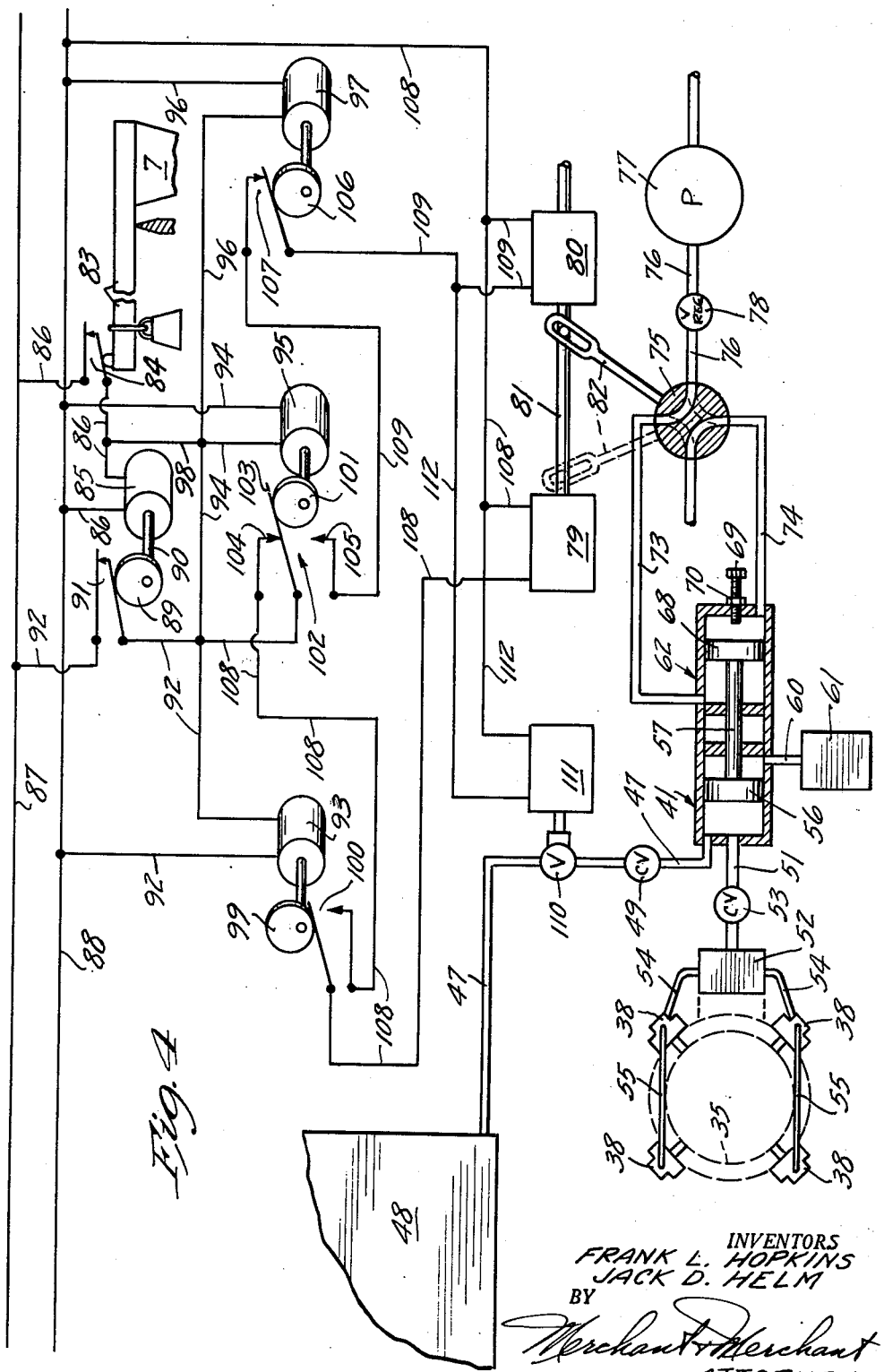

United States Patent Office 2,808,858
Patented Oct. 8, 1957

2,808,858

MACHINE FOR WEIGHING AND DISPENSING BULK MATERIAL AND HAVING MEANS FOR IMPREGNATING SAID MATERIAL WITH LIQUID

Frank L. Hopkins and Jack D. Helm, Minneapolis, Minn., assignors to Bemis Bro. Bag Co., St. Louis, Mo., a corporation of Missouri Application January 6, 1956, Serial No. 557,736

10 Claims. (Cl. 141—67)

Our invention relates generally to machines for weighing and dispensing granular or powdered bulk material and, more specifically, to attachments for such machines.

Still more particularly, our invention involves mechanism for injecting additives to powdered or granular bulk material after weighing and during dispensing of the same, said additives being in liquid form.

Heretofore, in order that the desired weight or quantity of bulk material be obtained when packaging the same, such additive, usually in the form of a liquid, has been applied to the material and mixed therewith before weighing. Difficulty has been experienced with many such materials in that, the moistened materials tends to adhere to the measuring or weighing container and other parts of the machine which it contacts, and uniform delivery and weight cannot be maintained. This situation is particularly true in the packaging of granular stock feed to which molasses or the like is added, and in the packaging of various baking mixes wherein shortening is one of the component parts of the mix, the shortening being added in liquid form. In other cases, such as in the packaging or otherwise dispensing of various fertilizers to which insecticides are added, the material of the insecticide is often corrosive, and damage to the weighing and dispensing machinery results from continued use of the insecticide.

An important object of our invention is the provision of novel mechanism for impregnating or coating the particles of granular bulk material with a liquid additive after said material has been measured and while the same is fed in a stream to a container or other receiver for storage and/or delivery to the consumer.

Another object of our invention is the provision of novel mechanism whereby liquid additive is applied to the material and uniformly mixed therewith by spraying measured quantities of the liquid into the material only during flow of said material to a receiver and after said material has been weighed.

Another object of our invention is the provision of novel control mechanism for accurately measuring the amount of liquid to be added to a predetermined quantity of granular or powdered material, and for timing the addition of said liquid to coincide with the material flow.

Still another object of our invention is the provision of means for quickly and easily varying the quantity of liquid additive relative to that of the material being treated.

A still further object of our invention is the provision of a container filling machine having a weighing device and an attachment for applying a liquid additive to bulk material, which may be quickly and easily cleaned when necessary, without the necessity of disassembling the machine.

Still another object of our invention is the provision of a device as set forth which is relatively simple and inexpensive to manufacture, which is highly efficient in operation, and which is rugged in construction and durable in use.

The above and still further highly important objects and advantages of our invention will become apparent from the following detailed specification, appended claims, and attached drawings.

Referring to the drawings, which illustrate the invention, and in which like characters indicate like parts throughout the several views, Fig. 1 is a view in front elevation of a container filling machine incorporating our invention;

Fig. 2 is an enlarged horizontal section taken substantially on the line 2—2 of Fig. 1;

Fig. 3 is an enlarged fragmentary view in side elevation of the liquid spraying mechanism of our invention, some parts being broken away and some parts shown in section;

Fig. 4 is a diaphragm showing the operating and control mechanisms of our invention.

Figures 1, 5:
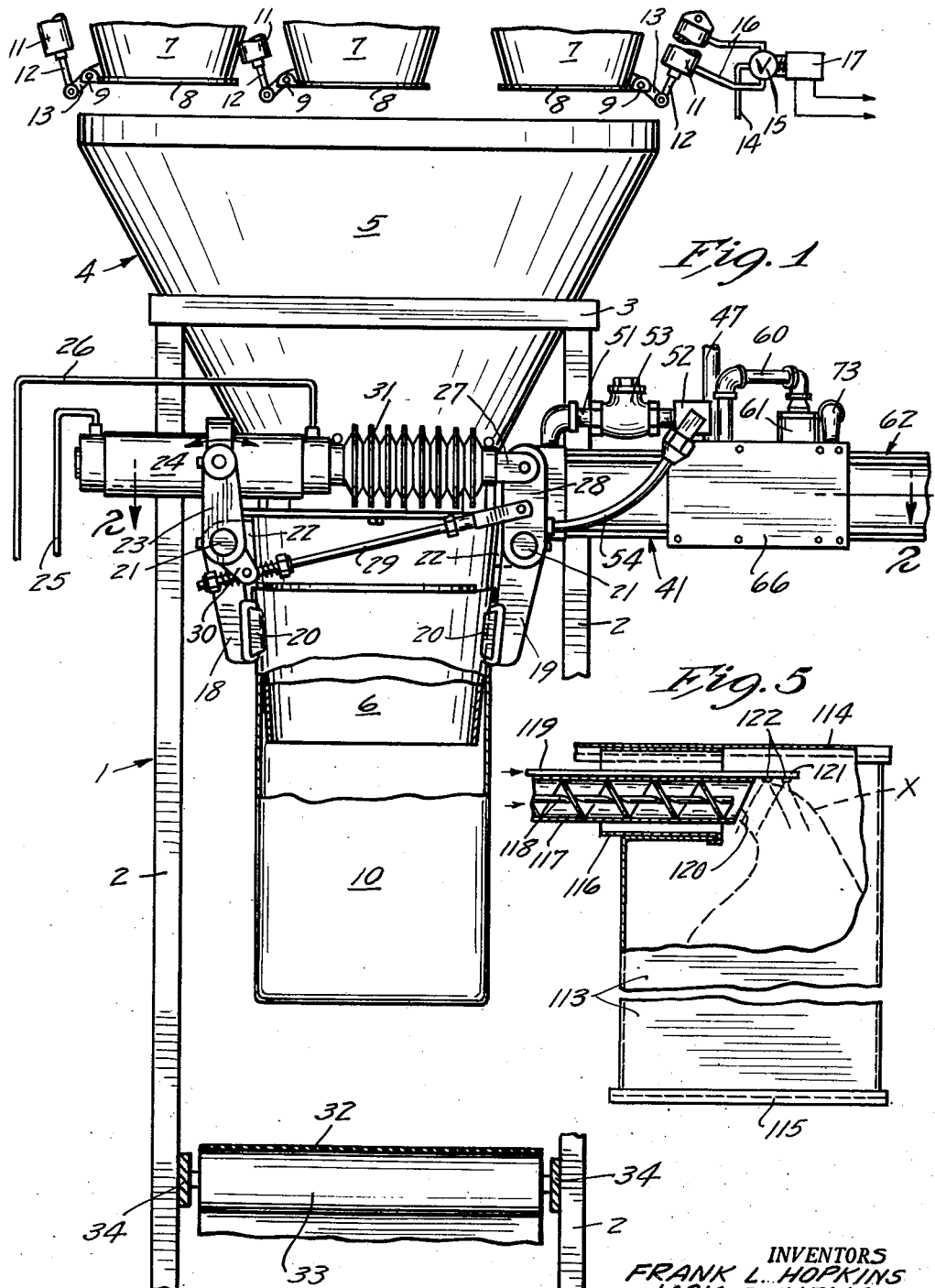
Fig. 5 is a view in front elevation of a modified form of our invention.

Referring with greater detail to the drawings, the numeral 1 indicates in its entirety a supporting structure or frame comprising upstanding legs 2 and a top frame member which supports a hopper-like conduit 4 comprising an upper conduit section 5 and a lower conduit section 6. The upper conduit section 5 underlies one or more weighing buckets 7 having bottoms 8 that are hinged, as indicated at 9, whereby material measured in the buckets 7 may be dumped into the conduit 4 for transferring to a bag or like container 10 supported on the lower conduit section 6. With reference to Fig. 1 it will be seen that the gate-like bottoms 8 are adapted to be opened and closed by suitable mechanism such as fluid pressure cylinders 11 and cooperating piston equipped plunger rods 12 that are connected to crank arms 13 secured to the bottoms 8. Fluid under pressure is introduced selectively to opposite ends of the cylinders 11 from a source of pressure, not shown, by conduits 14, valves 15, and branch conduits 16 leading from the valves 15 to opposite ends of the cylinders 11. Although only one of the cylinders 11 is shown as being equipped with said conduits and valves, it may be assumed that all of the cylinders of the several weighing buckets 7 are so equipped. The valves 15 are provided with valve-operating means in the nature of solenoids 17, one of which is shown.

The lower conduit section 6 is generally tubular in cross section and is gradually reduced in size from the upper end to the lower end thereof whereby an open-topped bag 10 may be easily placed thereon, as shown in Fig. 1. For the purpose of supporting the bag 10 on the conduit section 6, a pair of gripper arms 18 and 19, having bag engaging pads 20 at their lower ends, have their upper ends rigidly secured to rockshafts 21 that are suitably journaled in bearings 22 that are rigidly secured to the upper end portion of the lower conduit section 6 and at diametrically opposite sides thereof. A crank arm 23 is rigidly mounted on the shaft 21 which carries the crank arm 18 and has pivotally mounted thereon a fluid pressure cylinder 24 having conduits 25 and 26 that extend from opposite ends of the cylinder 24 to a source of fluid under pressure and control valve means, not shown. A piston equipped plunger rod 27 cooperates with the cylinder 24 and is pivotally secured at its outer end to a crank arm 28, the inner end of which is rigidly secured to the rockshaft 21 which carries the gripping arm 19. An equalizer rod 29 is secured at one of its ends to the crank arm 28, and at its other end to a relatively short crank arm 30 rigidly secured to the shaft 21 which carries the gripper arm 18. A rubber-like bellows 31 protects the plunger rod 27 from dust or other foreign matter. With the above arrangement, fluid introduced to the cylinder 24 through the conduit 26 will cause the plunger rod 27 to move relatively toward the cylinder 24, the tie rod 29 causing equal movement to be imparted to the cylinder 24 toward the crank arm 28, whereby to cause the gripping arms 18 and 19 to swing away from gripping contact with the bag 10 and permit the same to drop onto a belt conveyor 32 running over spaced rollers 33, one of which is shown. The supporting rollers 33 are journaled in cross members 34 rigidly secured to the legs 2 of the supporting structure 1. Obviously, introducing fluid under pressure to the cylinder 24 through the conduit 25 will move the cylinder 24 and plunger rod 27 in directions away from each other to cause clamping movement to be imparted to the gripping arms 18 and 19 to support the bag 10 on the lower conduit section 6.

Securely mounted between the lower end of the upper conduit section 5 and the upper end of the lower conduit section 6, and concentric therewith, is a mounting ring 35 that is provided with a plurality, as shown four, of radial openings 36 extending therethrough. Contained in the apertures 36 are spray nozzles 37 that are directed toward the center of the ring 35 and which are mounted in delivery heads 38. The delivery heads 38 are secured by anchoring bolts 39 and annular spacers 40 to the outer surface of the ring 35, the spray nozzles 37 being screw-threaded into the heads 38.

A pumping cylinder 41 extends radially outwardly from the mounting ring 35, and comprises a cylindrical body portion 42 and inner and outer heads 43 and 44, respectively. The inner head 43 is bolted or otherwise rigidly secured to a boss 45 integrally formed with the mounting ring 35, and is provided with an inlet opening 46 which communicates at one end with the interior of cylinder 41, and to the other end of which is connected a conduit 47 which leads to a supply tank 48, see Fig. 4. A check valve 49 is interposed in the conduit 47 and permits flow of liquid from the supply tank 48 to the interior of the cylinder 41, but prevents flow of liquid in the opposite direction. A solenoid operated control valve 110 is also inserted in the conduit 47 as will hereinafter be described. The cylinder head 43 is further provided with an outlet passage 50 which communicates at one end with the interior of the cylinder 41, and to the other end of which is connected a conduit 51 which leads to a manifold 52. A check valve 53 is interposed in the conduit 51 and permits delivery of liquid from the cylinder 41 to the manifold 52 but prevents return flow of liquid to the cylinder 41 from the manifold. A pair of delivery tubes 54 are connected at one end to opposite ends of the manifold 52 and at their opposite ends each to one of the delivery heads 38. A second pair of delivery tubes 55 are each connected to one of the delivery heads 38 to which the delivery tubes 54 are coupled, and at the other ends each to one of the other delivery heads 38, whereby all of the delivery heads 38 and nozzles 37 thereof are connected to the manifold 52. It will be noted with reference to Figs. 2 and 3 that the delivery tubes 55 are of smaller diameter than the tubes 54 for the purpose of equalizing the delivery pressure to all of the nozzles 37.

For the purpose of drawing liquid from the supply tank 48 to the interior of the cylinder 41, and for delivering liquid from the cylinder 41 to the several nozzles 37, we provide a pumping piston 56 that is mounted for reciprocatory movements in the cylinder 41. The pumping piston 56 is provided with a plunger rod 57 which extends axially outwardly through a packing gland 58 in the cylinder head 44. The cylinder head 44 is provided with a passage 59 which communicates with the interior of the cylinder 41 and to the opposite end of which is connected a breather tube or pipe 60 that extends to a conventional muffler 61, for the purpose of permitting free movement of air to and from the adjacent end portion of the cylinder 41 upon reciprocatory movement of the piston 56 therein.

A second cylinder 62 is interposed in axial alignment with the pump cylinder 41, and comprises a cylindrical member 63, an inner head 64 and an outer head 65. The cylinder 62 is supported in axial alignment with the cylinder 41 by a pair of plate-like members 66 secured at one of their ends to opposite sides of the cylinder head 44, and at their other ends to opposite sides of the cylinder head 64. The plunger rod 57 extends through a packing gland 67 in the cylinder head 64 and is rigidly secured to a piston 68 mounted for reciprocatory movements in the cylinder 62, whereby the pistons 56 and 68 are connected for common reciprocatory movements in their respective cylinders. A stop screw 69 extends axially through a screw-threaded opening in the outer cylinder head 65, the inner end of the screw 69 engaging the adjacent end of the piston 68 to limit axially outward movement thereof and the pumping piston 56. A lock nut 70 is screw-threaded on the stop screw 69 to lock the same in desired set position.

From the above it should be obvious that, when the pistons 56 and 68 are moved in a direction from the left to the right with respect to Fig. 2 to the positions shown therein, liquid will be drawn from the supply tank 48 to the interior of the pumping cylinder 41 to fill the space between the pumping piston 56 and the cylinder head 43; and that when the pistons 56 and 68 are moved from the right to the left with respect to Fig. 2, the liquid contained in the cylinder 41 will be delivered under pressure to the several nozzles 37 and sprayed toward the center of the mounting ring 35, whereby to impregnate or coat the particles of granular or powdered material flowing downwardly in a stream through the conduit sections 5 and 6.

The cylinder heads 64 and 65 are provided with passages 71 and 72, respectively, which communicate with the interior of the cylinder 62 at opposite sides of the piston 68. Fluid conduits 73 and 74 are connected at one end to the passages 71 and 72 respectively and at their other ends to a 4-way valve 75 which is connected by means of a conduit 76 to a source of fluid under pressure such as a pump 77, see Fig. 4. A conventional pressure regulator valve 78 is interposed in the conduit 76 between the pump 77 and the 4-way valve 75. With the valve 75 in its full line position of Fig. 4, fluid under pressure is delivered through the conduit 73 to the cylinder 62 in a direction to cause liquid to be drawn from the supply tank 48 to the pumping cylinder 41. Movement of the valve 75 to its dotted line position of Fig. 4 will cause fluid under pressure to be delivered to the cylinder 62 through the conduit 74 to move the pistons 56 and 68 in a direction to deliver liquid under pressure to the nozzles 37. The valve 75 is operated by a pair of solenoids 79 and 80 and suitable mechanism such as an armature 81 and a valve operating arm 82 coupled to the armature 81.

Means for controlling operation of the pumping mechanism above described involves electrical circuit means and control switches now to be described. With reference to Fig. 4 it will be seen that the scale buckets 7, one of which is there shown, are mounted on scale beams 83. Each scale beam 83 is operative, when a predetermined amount of granular bulk material is placed in the bucket 7, to close a normally open switch 84 to energize a switch operating motor 85. The motor 85 and switch or switches 84 are interposed in a circuit comprising a lead 86 opposite ends of which are connected to opposite sides 87 and 88 of a 2-wire electrical conductor which may be assumed to be connected to a source of electrical potential, not shown. A switch operating cam 89 mounted on the shaft 90 of the motor 85 is operative to close a normally open switch 91. It will be appreciated that, while only one scale beam 83 and switch 84 are shown, each of the scale buckets 7 is normally suspended from its individual scale beam, and operates a separate switch for the motor 85 to control the switch 91. The scale beams 83 and switches 84 in themselves do not comprise the instant invention. Hence, for the sake of brevity, detailed showing and description of more than one thereof is deemed unnecessary. The switch 91 is interposed in a lead 92 which extends from the power conductor line 87 to a timing motor 93 and from thence to the opposite power conductor line 88. A branch lead 94 is connected at one end to the lead 92 and extends from thence to a timing motor 95 and from thence to the conductor wire 88. A second branch lead 96 is connected at one end to the branch lead 94 and extends to another timing motor 97 and from thence to the conductor wire 88. It should be here noted that a holding circuit for the timing motor 85 includes a portion of the lead 86, portions of leads 92 and 94, the switch 91, and a short lead 98 whereby the timing motor 85 is energized by closing of the switch 84 and maintained in an energized condition until the switch 91 is opened. It may further be assumed that the operating solenoid 17 for each of the dumping cylinders 11 are controlled by the timing motor 85 by conventional switches, not shown, the same not in itself comprising the instant invention.

The timing motor 93 drives a cam 99 that is operative to control a switch 100. In like manner, the timing motor 95 drives cam means 101 that is operative to control a double throw switch 102 comprising a switch arm 103 and contacts 104 and 105. The timing motor 97 drives a cam 106 which operates switch 107. The switch 100, and switch arm 103 and contact 104 of switch 102 are connected in series with the solenoid 79 in a circuit comprising part of the lead 92, the switch 91 and a lead 108 which is connected at one end to the conductor wire 88. The switch arm 103 and contact 105 of switch 102, switch 107 and solenoid 80 are serially connected in a circuit comprising a portion of the lead 92, the switch 91, portions of the lead 108 and a lead 109. From the above, and with reference to Fig. 4, it will be noted that the solenoids 79 and 80 are in parallel circuits that are jointly controlled by the switch 91 and independently controlled by their respective switches operated by the timing motors 93, 95 and 97. The switches 102 and 107 are further operative to control the delivery of liquid from the supply tank 48 to the pump cylinder 41 by operating the valve 110 through the medium of a solenoid 111 that is interposed in a lead 112 connected at one end to the lead 109 and at its other end to the lead 108.

*Operation*

Assuming that the pump piston 56 and its cooperating piston 68 are positioned as in Fig. 2 and that the cylinder 41 between the piston 56 and cylinder head 43 is filled with liquid to be sprayed, granular material is fed into one of the weighing or measuring buckets 7 until the scale beam 83 thereof closes the switch 84. This closing of the switch 84 causes the timing motor 85 to be energized to close the switch 91 whereby to simultaneously energize the other timing motors 93, 95 and 97. Meanwhile, the cooperating solenoid 17 is energized to cause opening of the gate-acting bottom 8 of its respective weighing bucket 7 to discharge material therefrom in a stream into the conduit 4 from whence it descends into the bag 10. The switch operating cams 99, 101 and 106 are so shaped and timed relative to each other that, as the discharged material begins to flow past the mounting ring 35, the switch 100 is closed and the switch arm 103 engages the contact 104 to energize the solenoid 79, causing the valve 75 to be positioned to admit fluid under pressure through the conduit 74 to the second cylinder 62. The pistons 68 and 56 are moved thereby from the right to the left with respect to Fig. 2 to force liquid from the cylinder 41 through the tubes 54 and 55 and the nozzles 37 into the material flowing downwardly through the delivery conduit sections 5 and 6. Immediately upon cessation of the flow of said material past the mounting ring 35, the switch arm 103 is disengaged from the contact 104 and engages the contact 105, and the switch 107 is closed, the switch 100 having previously opened. Engagement of the switch arm 103 with the contact 105 and closing of the switch 107 causes the solenoids 80 and 111 to be energized to simultaneously open the valve 110 and shift the valve 75 to cause movement of the pistons 56 and 68 in a direction from the left to the right with respect to Figs. 2 and 4 to recharge the pumping cylinder 41 with liquid to be sprayed during the subsequent cycle of operation. The cam 106 is timed to open the switch 107 when the pumping piston reaches its limit of movement in a cylinder charging direction, whereby to deenergize the solenoid 111 to close the valve 110. With this arrangement, leakage of liquid from the supply tank 48 to the nozzles is prevented between operative cycles.

The various cams may be shifted relative to each other to vary the timing of the spraying operation, and adjustment of the screw 69 insures uniform and accurate measurement of the liquid to be sprayed. With the mechanism above described, it is a relatively simple matter to adjust the control of the spraying mechanism both as to timing and as to quantity, so that the same mechanism may be utilized in treating with equal uniformity, relatively small or relatively large quantities of material delivered to the bag 10. In other words, our improved mechanism is adjustable to treat small quantities such as 1 to 5 lb. batches or charges, as well as from 25 to 100 lb. batches or charges, with but minor adjustments. As described, the timing is such that the entire charge of the material is sprayed as it passes the nozzles 37. If desired, the timing may be quickly and easily varied so that the spraying operation may be confined to any selected portion of the stream of material as the material flows past the nozzles. While we have shown and described motors and motor driven cams for operating several of the control switches, it will be appreciated that equivalent devices such as relays of various types may be utilized to operate these switches in like manner.

In the modified arrangement illustrated in Fig. 5, we provide means for spraying granular or powdered bulk material as the same is dispensed into a container or bag 113 of the so-called "valve" type. This type of bag is normally closed at its top and bottom 114 and 115 respectively and is provided with a closable tubular valve 116 through which a feeder tube 117 is inserted. Normally, a material feeding device such as a feeding auger 118 is utilized to feed the granular material X into the bag. When a predetermined quantity of the material X is fed into the bag, the feeding tube 117 is withdrawn therefrom and the tubular valve 116 folded and in-tucked to close the bag for storage and shipment. For spraying the material X we provide a liquid conduit 119 extending longitudinally of the tube 117 and rigidly secured to the top surface portion thereof. The conduit 119 extends longitudinally outwardly of the delivery end 120 of the tube 117, the extended end portion 121 of the conduit 119 being provided with one or more nozzles 122 similar to the nozzles 37 and directed toward the stream of material X as it flows outwardly from the delivery tube 117. With this arrangement, none of the liquid sprayed from the nozzles 122 touches the feeding tube 117 or the feeding auger 118 therein. In this respect it will be noted that, with reference to Figs. 1–3, the mounting ring 35 is so located with reference to the weighing mechanism, any sprayed liquid which might come into contact with the interior surfaces of the conduit sections 5 and 6 may be easily removed from said surfaces with the use of a damp cloth or similar cleaning device, said conduit sections being within easy reach of the operator through the bottom of the lower conduit section 6.

While we have shown and described a commercial embodiment of our novel device and a single modification thereof, it will be understood that the same is capable of further modification, and that such further modification may be made without departure from the spirit and scope of the invention as defined in the claims.

What we claim is:

1. In a machine for filling containers with bulk material, means including a measuring device for dispensing selected quantities of said material and a conduit for transferring said material in a stream from said measuring device to a container, a spray nozzle directed toward the path of said stream, a pump for delivering a predetermined quantity of liquid under pressure to said nozzle, and control means including a control valve and timing mechanism for operating said valve to actuate said pump to cause a spray of liquid to be ejected from said nozzle into the stream of said material only during flow of said material to said container, said timing mechanism being responsive to the accumulation of a predetermined amount of material in said measuring device to cause actuation of said pump by said valve and to stop the spraying operation after a predetermined interval.

2. In a machine for filling containers with bulk material, means including a measuring device for dispensing selected quantities of said material and a conduit for transferring said material in a stream from said measuring device to a container, said conduit including a mounting ring, a plurality of spray nozzles mounted in said ring and directed toward the center thereof, a pump for delivering a predetermined quantity of liquid under pressure to said nozzles, and means for controlling the action of said pump to cause a spray of liquid to be ejected from said nozzles into the stream of said material only during flow of said material to said container.

3. The structure defined in claim 2 in which said pump comprises a pump cylinder mounted on said ring and a cooperating pump piston in said cylinder, and in further combination with a second cylinder and a piston mounted therein, a plunger rod connecting said pistons for common reciprocatory movements in their respective cylinders, said pump cylinder being connected to a source of liquid to be sprayed, said second cylinder being connected to a source of fluid under pressure, and control means including valves for said cylinders operative to cause reciprocatory movement of said pistons, movement of the pump piston in one direction causing liquid to be drawn into one end of the pump cylinder, movement of said pump piston in the opposite direction causing said liquid to be discharged through said nozzles.

4. The structure defined in claim 3 in which said pump cylinder and second cylinder are axially aligned, said plunger rod extending axially through adjacent ends of said cylinders, and in further combination with stop means limiting movement of said pistons in one direction whereby to limit the quantity of liquid drawn into said pump cylinder during said piston movement.

5. The structure defined in claim 4 in which said stop means comprises a stop screw extending through one end of said second cylinder and engaging the piston therein to stop movement of the same, said stop screw being adjustable longitudinally of said cylinder to vary the limit of movement of said pistons.

6. In a machine for filling containers with bulk material, means including a measuring device for dispensing selected quantities of said material and a conduit for transferring said material in a stream from said measuring device to a container, said conduit including a mounting ring, a plurality of circumferentially spaced spray nozzles mounted in said ring and directed toward the center thereof, a piston equipped pump cylinder mounted on said ring, means including a valve connecting said pump cylinder to a source of supply of liquid to be sprayed, conduit means connecting said pump cylinder to said nozzles, mechanism including a valve and a source of fluid pressure for moving the pump piston in one direction to draw liquid into said pump cylinder and in the opposite direction to cause said liquid to be delivered to said nozzles under pressure, valve operating means for said valves, and control means for said valve operating means operatively responsive to accumulation of a predetermined quantity of material in said measuring device and discharge of said material through said conduit to cause movement of said pump piston in a direction to deliver liquid to said nozzles under pressure only during flow of said material past said nozzles to said container and to thereafter cause movement to be imparted to said pump piston in the opposite direction to recharge said pump cylinder.

7. The structure defined in claim 6 in which said valve operating means comprises electrically controlled devices, and in which said control means comprises, an electrical circuit adapted to be connected to a source of electrical energy, a plurality of switches for said electrically controlled devices, timing motor means for operating said switches in predetermined timed relationship, and switch mechanism responsive to said accumulation of material in the measuring device to close said circuit.

8. In a machine for filling containers with bulk material, means including a measuring device for dispensing selected quantities of said material and a conduit for transferring said material in a stream from said measuring device to a container, a spray nozzle directed toward the path of said stream, a pump for delivering a predetermined quantity of liquid under pressure to said nozzle, and control means for said pump and including a timing device responsive to accumulation of a predetermined quantity of material in said measuring device to initiate operation of said pump to cause a spray of liquid to be ejected from said nozzle into the stream of said material during flow thereof to said container and to terminate operation of said pump after a predetermined interval.

9. The structure defined in claim 8 in which said nozzle is disposed longitudinally outwardly of the delivery end of said conduit, said delivery end of the conduit and said nozzle being adapted to be inserted into said container.

10. The structure defined in claim 9 in which said conduit is normally horizontally disposed, said nozzle defining the extended end portion of a liquid feeding tube secured to the top surface portion of said conduit, and in further combination with means for feeding bulk material through said conduit.

References Cited in the file of this patent

UNITED STATES PATENTS

| | | |
|---|---|---|
| 484,383 | Weatherhead | Oct. 11, 1892 |
| 1,635,936 | Gotten | July 12, 1927 |
| 2,711,277 | Riza | June 21, 1955 |